United States Patent [19]

White et al.

[11] 4,442,168

[45] Apr. 10, 1984

[54] COATED SUBSTRATE COMPRISING A CURED TRANSPARENT ABRASION RESISTANT FILLED ORGANO-POLYSILOXANE COATINGS CONTAINING COLLOIDAL ANTIMONY OXIDE AND COLLOIDAL SILICA

[75] Inventors: William H. White, La Puente; William C. Harbison; Gary L. Nelson, both of Lake Forest, all of Calif.

[73] Assignee: Swedlow, Inc., Garden Grove, Calif.

[21] Appl. No.: 489,697

[22] Filed: Apr. 28, 1983

Related U.S. Application Data

[62] Division of Ser. No. 309,423, Oct. 7, 1981, Pat. No. 4,390,373.

[51] Int. Cl.$^3$ .................... B32B 27/30; B32B 5/16; C09K 3/14
[52] U.S. Cl. ................................ 428/331; 427/387; 428/328; 428/412; 428/447; 428/451; 428/426
[58] Field of Search ............... 524/409; 106/287.11, 106/287.12; 428/412, 446, 447, 451, 522, 426, 457, 331, 328; 427/387

[56] References Cited

U.S. PATENT DOCUMENTS

| | | | |
|---|---|---|---|
| 2,568,384 | 9/1951 | Cheronis | 260/33.6 |
| 3,451,838 | 6/1969 | Burzynski | 117/33.3 |
| 3,560,244 | 2/1971 | Neuroth | 117/71 |
| 3,642,681 | 2/1972 | Hermes | 260/29.6 |
| 3,817,905 | 6/1974 | Lerner | 524/780 |
| 3,894,881 | 7/1975 | Suzuki | 106/287.12 |
| 3,955,035 | 5/1976 | Ito | 428/334 |
| 3,976,497 | 8/1976 | Clark | 428/450 |
| 3,986,997 | 10/1976 | Clark | 428/412 |
| 4,027,073 | 5/1977 | Clark | 428/412 |
| 4,084,021 | 4/1978 | Sandvig | 427/44 |
| 4,097,287 | 6/1978 | Ito | 106/14.14 |
| 4,100,075 | 7/1978 | Ashman | 524/409 |
| 4,159,206 | 6/1979 | Armbruster | 106/287.12 |
| 4,170,690 | 10/1979 | Armbruster | 428/447 |
| 4,177,315 | 12/1979 | Ubersax | 428/446 |
| 4,188,451 | 2/1980 | Humphrey | 428/331 |
| 4,207,357 | 6/1980 | Gossens | 427/162 |
| 4,210,699 | 7/1980 | Schroeter | 428/331 |
| 4,218,354 | 8/1980 | Hayati | 528/12 |
| 4,218,508 | 8/1980 | Humphrey | 428/331 |
| 4,239,668 | 12/1980 | Clark | 106/287.14 |
| 4,239,798 | 12/1980 | Schroeter | 428/331 |
| 4,242,381 | 12/1980 | Goossens | 427/387 |
| 4,242,383 | 12/1980 | Goossens | 427/387 |
| 4,242,416 | 12/1980 | Baney | 428/412 |
| 4,275,118 | 6/1981 | Baney | 428/412 |
| 4,311,738 | 1/1982 | Chi | 106/287.12 |

FOREIGN PATENT DOCUMENTS

| | | |
|---|---|---|
| 35609 | 9/1981 | European Pat. Off. . |
| 2276363 | 6/1975 | France . |
| 2322909 | 7/1976 | France . |
| 2383220 | 3/1978 | France . |
| 52-154837 | 12/1977 | Japan . |
| 53-2539 | 11/1978 | Japan . |
| 529200 | 11/1976 | U.S.S.R. . |

*Primary Examiner*—Ellis P. Robinson
*Attorney, Agent, or Firm*—Lyon & Lyon

[57] ABSTRACT

A cured transparent, abrasion resistant coating on at least one surface of a substrate. The coating composition comprises an effective abrasion resisting amount of a colloidal dispersion containing colloidal antimony oxide and colloidal silica in a weight ratio of less than or equal to about 30:70, in a water-alcohol solution of the partial condensate of $R(Si(OH)_3)$ wherein R is an organic radical.

27 Claims, No Drawings

COATED SUBSTRATE COMPRISING A CURED TRANSPARENT ABRASION RESISTANT FILLED ORGANO-POLYSILOXANE COATINGS CONTAINING COLLOIDAL ANTIMONY OXIDE AND COLLOIDAL SILICA

This is a division of application Ser. No. 309,423, filed Oct. 7, 1981 now U.S. Pat. No. 4,390,373.

BACKGROUND OF THE INVENTION

1. Field of the Invention

The present invention is directed to a coating composition which provides a transparent coating having improved abrasion resistance upon curing. More specifically, the coating compositions of the present invention contain a blend of colloidal antimony oxide and colloidal silica to provide filled organo-polysiloxane coatings having superior resistance to abrasion than filled organo-polysiloxane coatings containing only colloidal silica.

2. Description of the Prior Art

The use of transparent synthetic polymeric materials as windows or in glazing for automobiles, buses, aircraft and public buildings has widely increased in recent years. While these transparent polymers, such as polymethylmethacrylate, can be readily fabricated into the desired shape, they exhibit relatively low abrasion resistance. Consequently, to prevent the polymeric material from losing its optical clarity due to abrasion, it is imperative that the polymeric material be coated with a coating composition which is transparent and which protects the surface of the polymeric material from abrasion. Various coating compositions which can be coated on the surface of the transparent polymers are known in the art. In particular, prior coatings such as silica-containing solutions and polysilicic acid fluorinated copolymers are difficult to apply, have a low humidity resistance, or are expensive.

Clark, U.S. Pat. Nos. 3,976,497 and 3,986,997, and Ubersax, U.S. Pat. No. 4,177,315, describe coating compositions which comprise a dispersion of colloidal silica in a lower aliphatic alcohol-water solution of the partial condensate of a silanol of the formula $RSi(OH)_3$, such compositions containing 10 to 50 weight percent solids of which 10 to 70 weight percent is colloidal silica and 30 to 90 weight percent is the partial condensate. The abrasion resistance of the compositions described in Clark and Ubersax is imparted primarily by the colloidal silica. There is no suggesion in either Clark or Ubersax that any additional particles, let alone colloidal antimony oxide, may be added for improved abrasion resistance.

A coating composition similar to those described in the Clark and Ubersax patents is disclosed in Baney, U.S. Pat. No. 4,275,118. Baney describes an unpigmented coating composition which contains a dispersion of colloidal silica and colloidal titania in a water-alcohol solution of the partial condensate of a silanol having the formula $RSi(OH)_3$. The colloidal titanium dioxide is utilized as an ultraviolet absorbing means which is easily incorporated into the composition and is not itself degraded as the coating weathers. However, Baney clearly shows that the addition of the titanium dioxide actually decreases the abrasion resistance of the resulting coatings.

SUMMARY OF THE INVENTION

The present invention provides a coating composition which forms a transparent, abrasion resistant coating upon curing. The coating composition comprises an effective abrasion resisting amount of a colloidal dispersion containing colloidal antimony oxide and colloidal silica in a weight ratio of less than or equal to about 30:70, in a water-alcohol solution of the partial condensate of $R(Si(OH)_3)$ wherein R is an organic radical. Combining the colloidal antimony oxide with the colloidal silica provides filled organo-polysiloxane coatings which have superior resistance to abrasion than coatings containing only colloidal silica. Compositions containing a colloidal dispersion having a weight ratio of about 10:90 colloidal antimony oxide to colloidal silica provide optimum abrasion resistance. The partial condensate preferably comprises at least about 30 weight percent methyl trisilanol, and more preferably at least about 70 weight percent of the partial condensate is methyl trisilanol. The coating composition has a pH preferably ranging from about 3 to about 6, with a pH of about 5.5 particularly preferred for a longer stable shelf life. A latent condensate catalyst is preferably added to the coating composition to enable the composition to be more rapidly cured under milder conditions.

Accordingly, it is an object of this invention to provide a coating composition which forms a transparent coating upon curing.

It is a further object of this invention to provide a coating composition which forms a transparent coating upon curing which has improved abrasion resistance.

It is another object of this invention to provide a coating composition which forms an improved transparent abrasion resistance coating upon curing by blending colloidal antimony oxide and colloidal silica to form a colloidal dispersion.

The manner in which these and other objects and advantages of the present invention are achieved will become apparent from the detailed description of the invention which follows.

DETAILED DESCRIPTION OF THE INVENTION

The present invention relates to a coating composition which forms a transparent, abrasion-resistant coating upon curing. The composition comprises an effective abrasion resisting amount of a colloidal dispersion containing colloidal antimony oxide and colloidal silica in a weight ratio of less than or equal to about 30:70, in a water-alcohol solution of the partial condensate $R(Si(OH)_3)$ wherein R is an organic radical.

The colloidal dispersion is a blend of colloidal antimony oxide and colloidal silica, the colloidal particles generally having a particle size of less than 200 angstroms so that the cured coating is transparent. Particle sizes of less than 100 angstroms, and especially from about 14 to about 20 millimicrons, are particularly preferred for superior optical clarity. Moreover, the practice of the present invention requires that the antimony oxide and silica be colloidal rather than in solution. The colloidal antimony oxide is present in a weight ratio of less than or equal to about 30:70 colloidal antimony oxide to colloidal silica, and more particularly ranging from about 2:98 to about 30:70. Surprisingly, combining the colloidal antimony oxide with the colloidal silica in this weight ratio results in filled organopolysiloxane coatings which have superior resistance to abrasion than coatings containing only colloidal silica. If the weight ratio is greater than about 30:70 colloidal antimony oxide to colloidal silica, the abrasion resistance of the cured coating is no better than the abrasion resistance of coatings containing only colloidal silica. Moreover, compositions having a weight ratio of colloidal antimony oxide in blends with colloidal silica of greater than about 50:50 have unsatisfactory adhesion to a substrate. Compositions containing a colloidal dispersion having a weight ratio of about 10:90 colloidal antimony oxide to colloidal silica provide optimum abrasion resistance. The colloidal antimony oxide and colloidal silica particles are preferably separately incorporated into the composition during the condensation of the organosilane binder. Combining the colloidal antimony oxide and the colloidal silica before they are incorporated into the composition can result in the precipitation of colloidal particles out of the dispersion.

The colloidal silica can be prepared by methods known in the art, and a suitable colloidal silica is commercially available under the registered trademark NALCOAG from Nalco Chemical Co., 6218 West 66th Place, Chicago, Ill. 60836. NALCOAG 1034A is an acidic dispersion of colloidal silica, and is the preferred colloidal silica. A suitable colloidal antimony oxide is also commercially available under the tradename "Nyacol A1510LP" from Nyacol, Inc., Megunco Road, Ashland, Mass. 01721.

The colloidal silica and the colloidal antimony oxide are dispersed in a water-alcohol solution of the partial condensate of a silanol. The silanol preferably has the formula $R(Si(OH)_3)$ wherein R is a low molecular weight, short chain organic radical such as a lower alkyl or vinyl, phenyl, gamma-glycidoxy propyl, or gamma-methacryloxypropyl. The organic radical aids in the formation of the polymeric coating, but higher molecular weight organic radicals can hinder the cross linking of the silanol, resulting in a softer coating. The partial condensate preferably comprises at least about 30 weight percent methyl trisilanol, and more preferably at least about 70 weight percent of the partial condensate is methyl trisilanol. In particularly preferred coating compositions the partial condensate comprises 100 weight percent methyl trisilanol.

The partial condensate may also comprise mixtures of trisilanols and disilanols in which the trisilanols comprise at least 70 weight percent of the mixture. The disilanols have the formula $R^1_2(Si(OH)_2)$ wherein $R^1$ is independently a low molecular weight, short chain organic radical as described with R. Partial condensates comprising such a mixture form coatings having increased flexibility but decreased hardness. However, the greater the weight percentage of the trisilanol, the more suitable is the hardness of the resulting coating.

The silanols are preferably generated in situ by the hydrolysis of the corresponding alkoxysilane in an aqueous dispersion of the insoluble colloidal silica and colloidal antimony oxide. Preferably this reaction temperature is between 35° F. and 85° F., and the pH is maintained from about 3 to about 6. Suitable alkoxysilanes have alkoxy substituents such as methoxy, ethoxy, isopropoxy, methoxyethoxy, t-butoxy, and acetoxy which, upon the hydrolysis of the silane, form the corresponding alcohol or acid. Once the silanol forms in the acidic aqueous medium, a portion of the silicon-bonded hydroxyl groups of the silanol condense to form silicon-oxygen-silicon bonds. The silanol, however, is only partially condensed and retains a portion of the silicon-bonded hydroxyl groups to render the polymer soluble in the water-alcohol solvent. When the coating is cured, the remaining hydroxyl groups condense to form a selsesquioxane, $(RSiO_{3/2})_n$.

Coating compositions according to the present invention are preferably prepared by dispersing the colloidal antimony oxide and the colloidal silica in separate aqueous or aqueous-alcohol solutions to form a hydrosol. Both hydrosols are then sequentially added to a solution of the alkoxysilane in acid. The solution of alkoxysilane contains a sufficient amount of acid to provide a pH preferably ranging from about 3 to about 6. At a lower or higher pH, the colloidal particles tend to precipitate out. A pH of about 4 to about 6, and especially about 5.5, is particularly preferred to provide a longer stable shelf life of about 7 to about 8 weeks at ambient temperature. Compositions having a pH between about 3 to about 4 generally have a shorter shelf life, often requiring use the same day. The acid is preferably an organic acid, such as acetic acid, since organic acids evaporate readily as the coating is drying and enhance adhesion of the coating to the substrate. Other suitable organic and inorganic acids are disclosed in Clark, U.S. Pat. No. 3,986,997, the disclosure of which is hereby incorporated by reference.

After the hydrosol and alkoxysilane solution are mixed together, substantially all of the alkoxysilane rapidly hydrolyzes to form a corresponding silanol and alcohol. A portion of the silanol is then condensed to form the partial condensate. The mixture preferably contains enough alcohol to form a water-alcohol co-solvent system to ensure the solubility of the partial condensate. Additional water, alcohol or another polar solvent such as acetone can be added to the mixture to form a suitable solvent system, thereby altering the weight percentage of solids in the composition. Suitable alcohols are lower aliphatic alcohols such as methanol, ethanol, propanol, isopropanol, isobutanol and n-butanol. Isopropanol and n-butanol are particularly preferred. Other alcohols can also be utilized in the practice of the present invention.

The coating composition preferably contains from about 10 weight percent to about 50 weight percent total solids. These solids comprise about 5 weight percent to about 70 weight percent of the combined colloidal dispersion and about 30 weight percent to about 95 weight percent of the partial condensate. As previously indicated, the combined colloidal dispersion contains a weight ratio of less than or equal to about 30:70 colloidal antimony oxide to colloidal silica, and more particularly ranging from about 2:98 to about 30:70. It will be appreciated that the amount of solids in the coating and the composition of the solids may vary over the above percentages depending upon the desired properties of the cured coatings for particular applications.

A latent condensation catalyst is preferably added to the coating composition to enable the composition to be more rapidly cured under milder conditions. A sufficient amount of the catalyst is added to the composition to preferably comprise from about 0.05 weight percent to about 2.0 weight percent of the coating composition. Suitable condensation catalysts include choline acetate, sodium acetate, ethanolamine acetate, and benzyl-trimethylammonium acetate.

The coating composition of the present invention can be readily applied to a variety of substrates such as glass, polycarbonates, acrylics, etc., and some metals, such as brass, by methods well-known in the art, e.g., flow, spray or dip processes, to improve scratch and mar resistance. After the coating is applied to the substrate, the composition is preferably cured at temperatures of about 140° F. to about 300° F. depending on the stability of the substrate. Curing times of about ½ hour to about 24 hours are required to complete the condensation reaction and to form the transparent, abrasion resistant coating of the present invention. The cured coating preferably has a final thickness of about 1 to about 20 microns, with about 3 to 12 microns particularly preferred.

Preferred organo-polysiloxane coatings of the present invention can be prepared by hydrolyzing methyl trialkoxysilane in the presence of aqueous acidic dispersions of colloidal antimony oxide and colloidal silica. The silane is first acidified by the addition of acetic acid, and the resulting composition is cooled to approximately 35° F. before the addition sequentially of the colloidal silica hydrosol (Nalcoag 1034A) and the colloidal antimony oxide hydrosol (Nyacol A1510LP). If desired, the colloidal antimony oxide hydrosol can be diluted with a water/acid solution before it is added to the silanol to adjust the pH, thereby guarding against precipitating out any of the colloidal particles, or the water/acid solution can be added separately. After standing for 24 hours at a temperature between about 35° F.–50° F., and preferably about 45°–50° F., the compositions are diluted with a mixture of isopropanal and butanol to provide a solids content between 16 and 17 weight percent, and choline acetate is added thereto as a catalyst. The pH is adjusted to about 5.6 with acetic acid. The resulting compositions can be flow coated on an acrylic sheet which is then cured for 2 hours at 200° F. to provide the transparent coatings having improved abrasion resistance of the present invention.

The following examples illustrate the present invention.

EXAMPLE 1

Samples A, B and C below were prepared as described above. In Sample A, a water/acid solution was added to the colloidal antimony oxide hydrosol before it was added to the composition, while in Sample B the water/acid solution was added subsequent to the colloidal silica and colloidal antimony oxide hydrosols. Sample C was a control sample which did not contain any colloidal antimony oxide, and which corresponded to the compositions described in Clark, U.S. Pat. No. 3,986,997. The coated sheets were evaluated for resistance to abrasion under the ASTM D-1044 Taber test about 100 and 500 revolutions, each of the sheets being tested at the same time and under the same conditions.

TABLE I

|  | A | B | C |
| --- | --- | --- | --- |
| silane, grams | 281 | 281 | 244 |
| acetic acid, grams | 15.2 | 15.5 | 10.0 |
| Nalcoag 1034A, grams | 158.5 | 158.5 | 229 |
| Nyacol A1510P, grams | 50.5 | 50.5 | — |
| Water, grams | 18.2 | 18.2 | — |
| Isopropanol, grams | 503 | 503 | 596 |
| butanol, grams | 141 | 141 | 141 |
| Choline acetate, 10% solution, grams | 28.9 | 28.9 | 15.0 |
| pH | 5.6 | 5.6 | 5.6 |
| Taber Abrasion % delta change |  |  |  |
| 100 rev. | 0.8 | 0.5 | 2.0 |

TABLE I-continued

|  | A | B | C |
| --- | --- | --- | --- |
| 500 rev. | 3.9 | 2.8 | 9.5 |

As can be seen, the cured coatings of the present invention have superior resistance to abrasion than the coating containing silica alone.

EXAMPLE 2

Additional coating compositions of the present invention having the following weight ratio of colloidal antimony oxide to colloidal silica and solids ratio were flow coated on acrylic sheets and cured at 200° F. for 2 hours before testing for abrasion resistance, and compared to control samples containing only colloidal silica as described in the Clark patent, and compositions containing only colloidal antimony oxide. These coated sheets were also tested for light transmission and haze using ASTM D-1004. The tests were again performed at the same time and under the same conditions.

TABLE II

| Sample | Filler Ratio $Sb_2O_5/SiO_2$ | Solids Ratio Resin/Filler | LT | Haze | Taber 100 Rev | Taber 500 Rev | Adhesion |
| --- | --- | --- | --- | --- | --- | --- | --- |
| 1 | 2/98 | 62/38 | 94.4 | 0.1 | 2.2 | 8.3 | 100 |
| 2 | 5/95 | 65/35 | 94.6 | 0.1 | 1.5 | 7.1 | 100 |
| 3 | 10/90 | 69/31 | 94.5 | 0.3 | 1.0 | 5.7 | 100 |
| 4 | 15/85 | 72/28 | 94.4 | 0.2 | 1.0 | 5.6 | 100 |
| 5 | 20/80 | 75/25 | 94.1 | 0.2 | 1.3 | 7.8 | 100 |
| 6 | 30/70 | 79/21 | 94.1 | 0.2 | 1.3 | 8.2 | 100 |
| 7 | 100/0 | 90/10 | 93.8 | 0.3 | 1.5 | 13.0 | 100 |
| 8 | 0/100 | 60/40 | 94.4 | 0.0 | 1.4 | 8.5 | 100 |

From the above, it can again be seen that the coating compositions of the present invention exhibit improved abrasion resistance over those compositions which contain only colloidal silica or only colloidal antimony oxide.

While the preferred application of this invention has been shown and described, it will be apparent to those skilled in the art that many more modifications are possible without departing from the inventive concept herein described.

We claim:

1. An article manufactured by applying to at least one surface of a substrate a coating composition which forms a transparent, abrasion-resistant coating upon curing, said coating composition comprising an effective abrasion resisting amount of a colloidal dispersion containing colloidal silica and an effective abrasion resistance enhancing amount of colloidal antimony oxide in a weight ratio of less than or equal to about 30:70, antimony oxide:silica, in a water-alcohol solution of the partial condensate of $R(Si(OH)_3)$ wherein R is an organic radical, and curing said applied coating composition.

2. An article as in claim 1 wherein said organic radical is selected from the group consisting of $C_1$-$C_4$ alkyl and vinyl, gamma-gylcidoxypropyl and gamma-methacryloxypropyl.

3. An article as in claim 1 wherein the cured coating composition forms a coating matrix of $(RSiO_{3/2})$ and the colloidal dispersion.

4. An article as in claim 1 wherein the coating matrix consists of about 5 percent to about 70 percent of the colloidal dispersion.

5. An article as in claim 1 wherein the substrate is a polymethylmethacrylate plastic sheet.

6. An article having a transparent, abrasion-resistant coating applied to at least one of its surfaces, said coating forming a matrix of a colloidal dispersion containing colloidal silica and an effective abrasion resistance enhancing amount of colloidal antimony oxide in a weight ratio of less than or equal to about 30:70, antimony oxide:silica, and $(RSiO_{3/2})$ wherein R is an organic radical.

7. An article manufactured by applying to at least one surface of a substrate a coating composition which forms a transparent, abrasion-resistant coating upon curing, said coating composition comprising an effective abrasion resisting amount of a colloidal dispersion containing colloidal antimony oxide and colloidal silica in a weight ratio of from about 2:98 to about 30:70, in a water-alcohol solution of a partial condensate comprising a mixture of $R(Si(OH)_3)$ and $R^1{}_2(Si(OH)_2)$ wherein R and $R^1$ are organic radicals, and said condensate contains at least about 70 percent by weight $R(Si(OH)_3)$.

8. An article manufactured by applying to at least one surface of a substrate coating composition which forms a transparent abrasion resistant coating upon curing, said coating composition comprising an effective abrasion resisting amount of a colloidal dispersion containing colloidal antimony oxide and colloidal silica in a weight ratio of about 10:90, in a water-alcohol solution of the partial condensate of $CH_3Si(OH)_3$, said composition containing sufficient acid to provide a pH of about 5.5.

9. An article as in claim 1 wherein said partial condensate contains at least 30 percent by weight methyl trisilanol.

10. An article as in claim 1 wherein said partial condensate contains at least 70 percent by weight methyl trisilanol.

11. An article as in claims 6 or 7 wherein said organic radical R is a methyl group.

12. An article as in claims 1 or 7 wherein said composition contains sufficient acid to provide a pH in the range of about 3 to about 6.

13. An article as in claim 10 wherein said acid is acetic acid.

14. An article as in claims 1 or 7 wherein said composition contains from about 10 percent to about 50 percent solids.

15. An article as in claim 13 wherein said solids contain about 5 percent to about 70 percent of said colloidal dispersion.

16. An article as in claims 1 or 7 wherein said solids contain about 30 percent to about 95 percent of said partial condensate.

17. An article as in claims 1 or 7 wherein said composition additionally includes a latent condensation catalyst.

18. An article as in claim 15 wherein said catalyst is taken from the group consisting of choline acetate, sodium acetate, ethanolamine acetate, and benzyl-trimethylammonium acetate.

19. An article as in claim 15 wherein said composition contains from about 0.05 percent to about 2 percent of said catalyst.

20. An article as in claim 15 wherein said catalyst is choline acetate.

21. An article as in claims 1 or 7, wherein the alcohol in the water-alcohol solution is a lower aliphatic alcohol.

22. An article as in claim 20 where said alcohol is isobutanol.

23. An article as in claim 20 wherein said alcohol is isopropanol.

24. An article as in claims 1 or 6 wherein the weight ratio ranges from about 2:98 to about 30:70 colloidal antimony oxide to colloidal silica.

25. An article as in claim 22 wherein said composition contains sufficient acid to provide a pH of about 5.5.

26. An article as in claims 7 or 8 wherein said coating composition is cured.

27. A process for rendering the surface of a substrate abrasion-resistant by:
(a) applying to at least one surface of a substrate a coating composition which forms a transparent, abrasion-resistant coating upon curing, said coating composition comprising an effective abrasion-resisting amount of a colloidal dispersion containing colloidal silica and an effective abrasion resistance enhancing amount of colloidal antimony oxide and colloidal silica in a weight ratio of less than or equal to about 30:70, antimony oxide:silica, in a water-alcohol solution of the partial condensate of $R(Si(OH)_3)$ wherein R is an organic radical; and
(b) curing said applied coating composition.

* * * * *